United States Patent [19]

Voller

[11] 4,316,690

[45] Feb. 23, 1982

[54] CAPPED BOLT

[76] Inventor: Ronald L. Voller, Rte. 1 - Box 279 - Bordeaux La., Lake Grove, Ill. 60047

[21] Appl. No.: 149,848

[22] Filed: May 14, 1980

[51] Int. Cl.³ .................................... F16B 23/00
[52] U.S. Cl. ................................................ 411/377
[58] Field of Search ............... 411/377, 378, 373, 542, 411/903, 902, 900, 301

[56] References Cited

U.S. PATENT DOCUMENTS

| | | | |
|---|---|---|---|
| 2,908,309 | 10/1959 | Brill | 411/301 |
| 2,983,534 | 5/1961 | Heller et al. | 411/301 X |
| 3,557,654 | 1/1971 | Weidner, Jr. | 411/378 |
| 3,618,444 | 11/1971 | Kay et al. | 411/373 |
| 3,885,492 | 5/1975 | Gutshall | 411/373 |
| 4,154,138 | 5/1979 | Melone | 411/373 |
| 4,235,147 | 11/1980 | Weidner, Jr. | 411/542 X |

Primary Examiner—Ramon S. Britts
Attorney, Agent, or Firm—Dithmar, Stotland, Stratman & Levy

[57] ABSTRACT

A capped bolt having a threaded shank adapted to receive a nut thereon and a bolt head laterally larger than the shank having a lead surface adjacent the threads. A rigid thermoplastic cap capable of cold flow deformation substantially surrounds the bolt head and has an annular lip in contact with the lead surface having a free end thereof near the shank threads. The annular lip has both exterior surfaces thereof facing the shank such that a line tangent to each surface intersects the shank. When the nut is tightened on the bolt, the lip cold flows into an oversized aperture of at least one of the two or more members being bolted and between the threads providing a hermetic seal.

9 Claims, 9 Drawing Figures

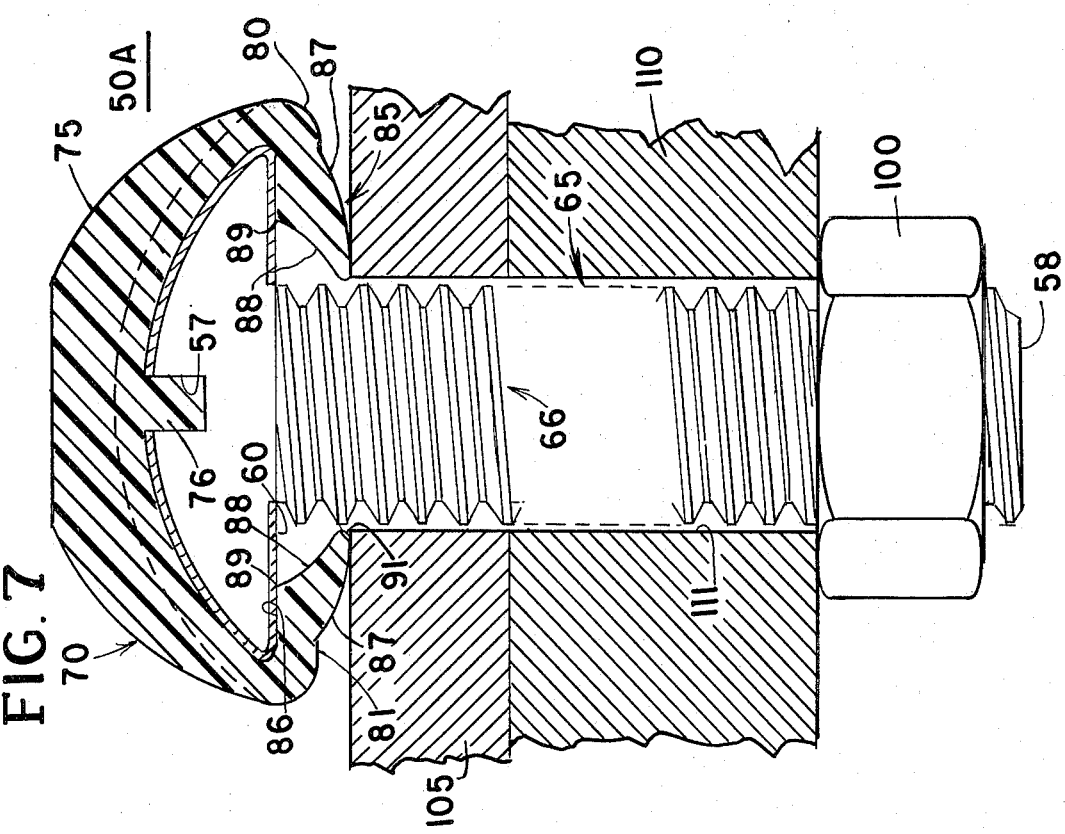
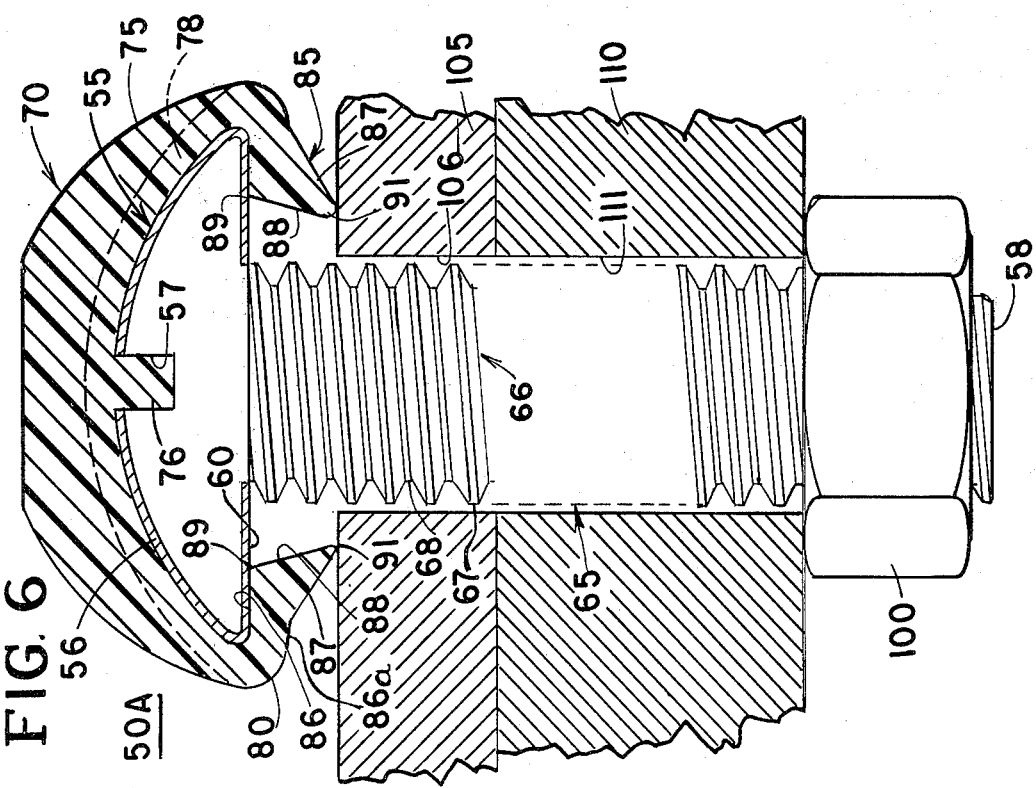

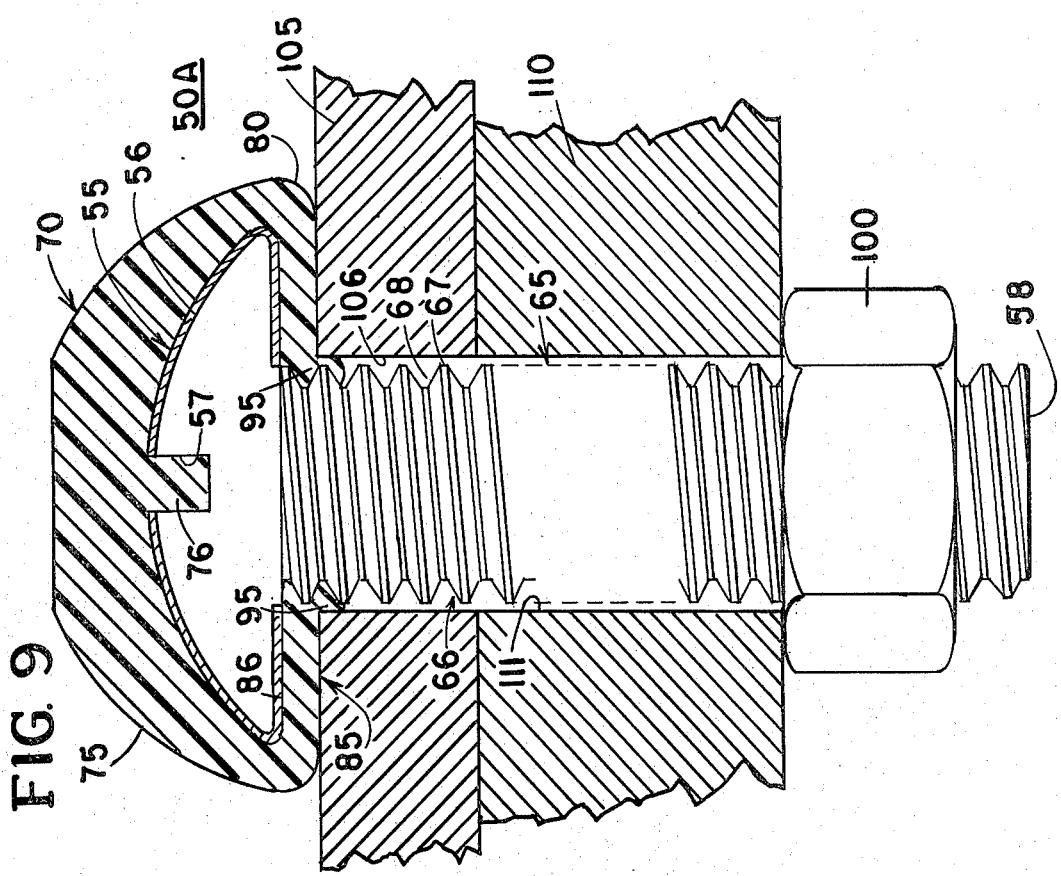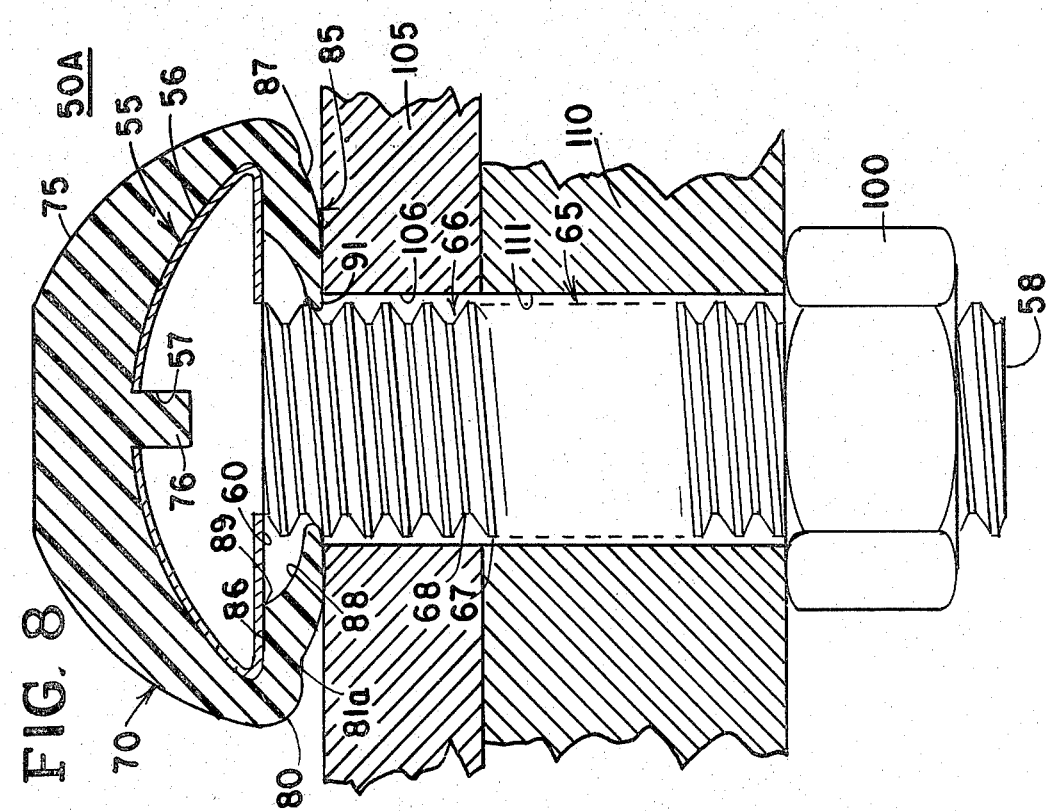

CAPPED BOLT

BACKGROUND OF THE INVENTION

This invention relates generally to fasteners such as are used for securing two or more sheets of sheet metal paneling for outdoor storage structures such as silos or the like. More particularly, the invention relates to the type of fastener having a plastic cap or the like secured to the head of the fastener which may be colored to match the metal paneling to blend in with the paneling and is protected against corrosion by the plastic cap. Most importantly, this invention relates to a fastener consisting of a bolt and nut in which the fastener is specifically designed not to be driven but merely to be held against rotation during tightening of the nut. The cap not only protects the bolt from corrosion, but the seals resulting from use of this fastener normally are hermetic as well as water tight.

There has been and still is great need in industry to provide a capped fastener, that is fastener having a plastic cap or covering to prevent corrosion of the fastener and also to provide a water tight or hermetic seal when the fastener is in place. This is particularly critical in outdoor construction of storage facilities such as silos, barns and the like. Heretofore, there has not been commercially available a fastener which successfully employs a plastic cap, there being relatively few commercially available and there being none which is generally satisfactory. All of the commercially available fasteners suffer from the problem of the plastic cap being stripped from the screw during driving.

Further, the plastic underneath the screw head splays outwardly from underneath the head as the screw is tightened, thereby losing the most important sealing qualities of the plastic cap.

The patent literature shows several variations of capped fasteners, all of which are the driving type, none being directed to combination fasteners of bolts and nuts. U.S. Pat. No. 4,154,138 issued May 15, 1979 to Malone describes a screw with a plastic head showing a driving screw having a multifaceted head to ensure that the plastic cap remains on the screw during driving.

U.S. Pat. No. 3,385,492 issued May 27, 1975 to Gutshall describes a driving fastener having a plastic cap on the head thereof in which a flexible and yieldable center portion permits the insertion of a driving tool into a tool receiving recess in the screw head.

U.S. Pat. No. 3,693,495 issued Sept. 26, 1972 to Wagner shows a driving screw having a plastic head and washer portion in which the screw head is multifaceted in order to retain the plastic cap thereon during driving.

U.S. Pat. No. 3,639,137 issued Feb. 1, 1972 to Marinelli describes a rivot having pressure rupturable capsules on the shank thereof, the capsules containing liquid sealant.

U.S. Pat. No. 3,557,654 issued Jan. 26, 1971 to Weidner describes a composite fastener having a plastic head with a thin elastic skirt for forming liquid seals when the fastener is driven.

U.S. Pat. No. 3,134,290 issued May 26, 1964 to Jentoft describes a fastener having a plastic cap with a flexible lip and a conical elastic and flexible skirt forming liquid seals when the fastener is driven.

U.S. Pat. No. 2,032,099 issued Feb. 25, 1936 to Rosenberg shows a fastener having a soft metal head or cap which acts as a washer for the fastener.

SUMMARY OF THE INVENTION

A general object of the invention is to provide a bolt having a plastic cap which is effective to provide a liquid seal when the bolt is drawn down against the work surface by a nut, and more particularly relates to a plastic capped bolt which provides a hermetic seal as well as a liquid seal.

A principal object of the invention is to provide a bolt for a combination bolt and nut fastener holding a plurality of members in predetermined spaced relation, the bolt comprising a threaded shank adapted to receive a nut thereon, a bolt head laterally larger than the shank having a lead surface, a synthetic organic resin cap substantially surrounding the bolt head, the synthetic organic resin cap having an annular lip with a portion thereof in contact with the lead surface and another portion thereof extending laterally inward toward the shank, the annular lip being angularly positioned and having a sufficient thickness and length to deform toward the shank providing a hermetic seal when the nut is tightened.

Another object of the present invention is to provide a bolt of the type set forth comprising a threaded shank adapted to receive a nut thereon, a bolt head laterally larger than the shank having a lead surface, a plastic cap capable of cold flow deformation substantially surrounding the bolt head, the plastic cap having an annular lip in contact with the lead surface and having a free end extending laterally inwardly toward the shank, the annular lip having inner and outer exterior surfaces thereof such that lines tangent thereto intersect the shank, the annular lip being angularly positioned and having a sufficient thickness and length that when the nut is tightened on the bolt to hold the members the lip cold flows toward the shank providing a hermetic seal.

A further object of the present invention is to provide a bolt for a combination bolt and nut fastener for holding a plurality of members each having an aperture oversized with respect to the bolt shank in predetermined spaced relation, the bolt comprising a threaded shank adapted to receive a nut thereon, a bolt head laterally larger than the shank having a lead surface adjacent the threads, a plastic cap capable of cold flow deformation substantially surrounding the bolt head, a plastic cap having an annular lip in contact with the lead surface having a free end thereof near the shank threads, the annular lip having an exterior surface thereof facing the shank such that a line tangent to the surface intersects the shank, the annular lip being angularly positioned and having a sufficient thickness and length that when the nut is tightened on the bolt to hold the members and lip cold flows into an oversized aperture of at least one of the members and between the threads providing a hermetic seal.

These and other objects of the invention will be more readily understood when taken in conjunction with the following specification and drawings, in which:

BRIEF DESCRIPTION OF THE DRAWINGS

FIGS. 6 through 9 show progressive stages of compression of the plastic cap on the inventive bolt when the nut is tightened against a plurality of members.

DESCRIPTION OF THE PREFERRED EMBODIMENT

Figure 1:
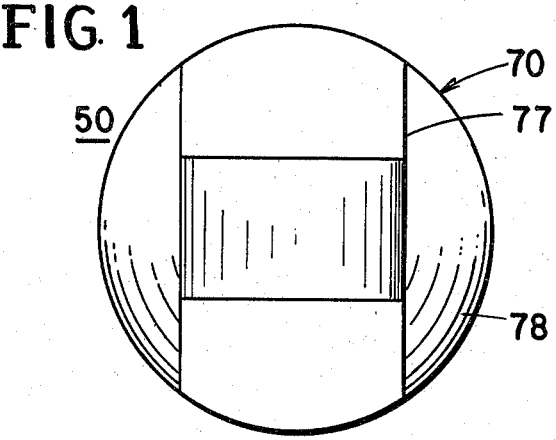
FIG. 1 is a top plan view of a capped bolt.
Figure 2:
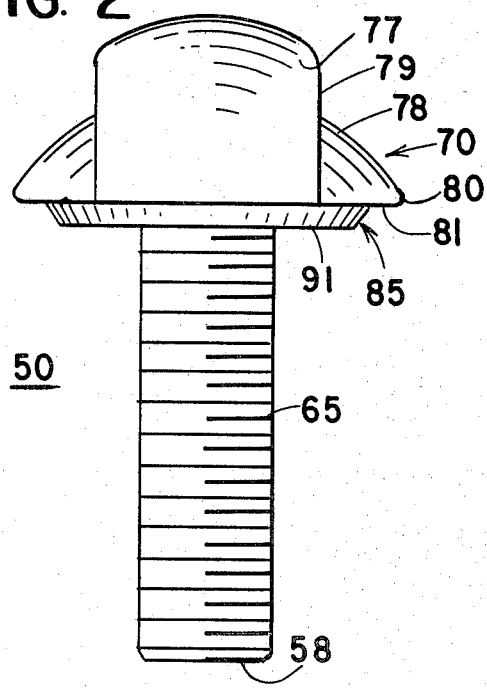
FIG. 2 is a side elevational view of the bolt illustrated in FIG. 1.
Figure 3:
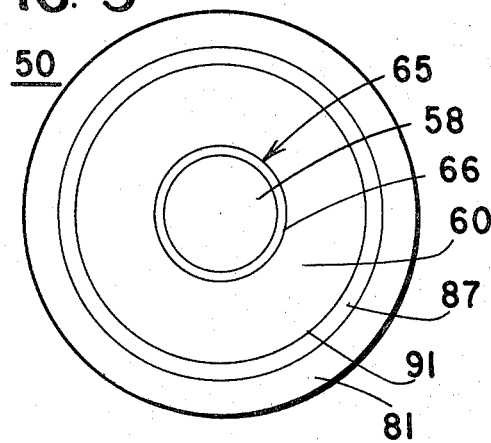
FIG. 3 is a bottom elevational view of the bolt illustrated in FIG. 1.

Referring now to the drawings, particularly FIGS. 1 to 3, there is illustrated a bolt 50 having a head 55 with a dome-shaped surface 56 having a slot 57 therein. The head 55 has an annular and planar lead surface 60 at the bottom thereof connected to a longitudinally extending shank 65 having a bottom surface 58. The shank 65 has threads 66 extending longitudinally thereof in the usual helical pattern provided with crests 67 and valleys 68.

A cap 70 of a synthetic organic resin, preferably a thermoplastic material, substantially surrounds the head 55 of the bolt and includes a head covering portion 75 and a retention portion 76 which is molded into the slot 57 in order to maintain the cap 70 in place on the bolt head 55. The cap 70 and more particularly the head covering portion 75 thereof is provided with a raised portion 77 (FIGS. 1 and 2) and a dome-shaped portion 78, the portion 78 having a reduced thickness compared to the portion 77. The portion 77 of the cap 70 is to fit within a tool (not shown) and to maintain the bolt 50 against rotation when a nut 100 is secured thereto. Accordingly, the raised portion 77 is provided with opposed straight vertical sides 79 in order for a tool having a mating configuration firmly to grip the cap 70 of the bolt during tightening.

The cap 70 has rounded outside rim edge 80 integral with the dome-shaped area 78 and a flat annular portion 81 extending underneath the bolt head 55 and more particularly underneath a portion of the lead surface 60 on the bottom of the bolt head 55. This is particularly illustrated in FIG. 2 of the drawings.

Integral with the head covering portion 75 of the cap 70 and particularly the annular portion 81 thereof is a downwardly and inwardly directed annular lip 85 having a flat or planar annular surface 86 in contact with a portion of the lead surface 60 of the bolt head 55, the annular lip having an outer facing exterior surface 87 and an inner facing exterior surface 88, both of which are planar surfaces, see particularly FIGS. 6 to 9. The lip 85 and more particularly the inner exterior surface 88 thereof terminates at a juncture 89 between the surfaces 86 and 88 forming a circle at the lead surface 60 of the bolt head 55. The outer and inner exterior surfaces 87 and 88 meet at the free end 91 of the lip 85 and both and free end 91 and the juncture 89 form concentric circles in transverse cross section.

Figure 4:
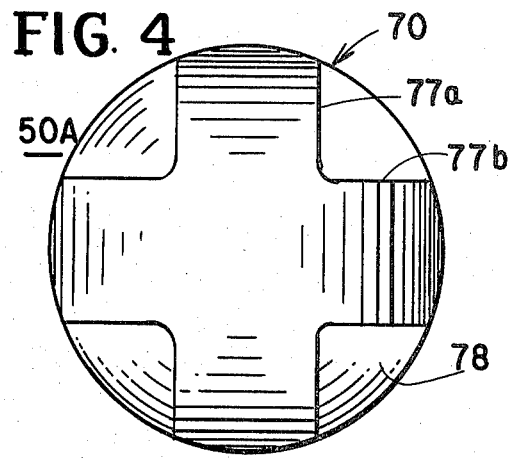
FIG. 4 is a top plan view of a second embodiment of the invention.
Figure 5:
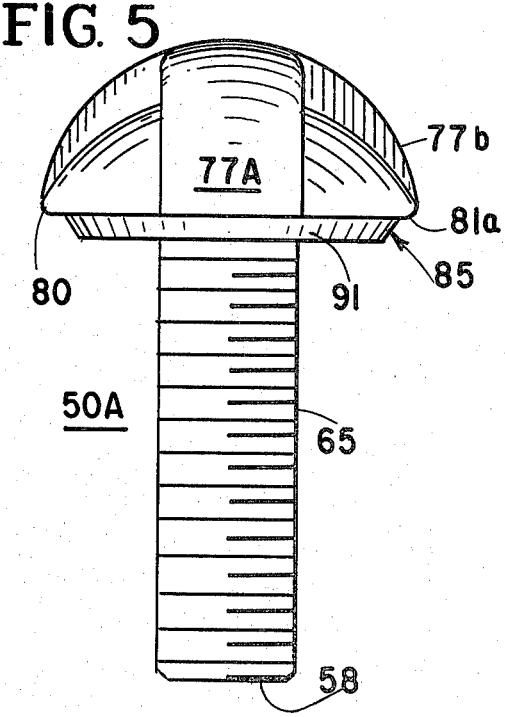
FIG. 5 is a side elevational view of the bolt illustrated in FIG. 4.

FIGS. 4 and 5 show a second embodiment of the bolt 50A utilizing a different shaped cap 70 which is cruciform in plan view. Specifically, legs 77a and 77b of the cap 70 form a cruciform which in cooperation with a mating tool firmly holds the bolt 50A against rotation during tightening of the associated nut 100. Another difference is the reduced length of the annulus 81. In all respects operation of bolts 50 and 50A are identical. Referring now to FIGS. 6 through 9, there is disclosed a series of illustrations showing the deformation of the lip 85 during gradual tightening of the nut 100 on the threaded portion 66 of the shank 65. More particularly, FIG. 6 illustrates the condition of the bolt 50A prior to compression of the lip 85 against the work, in the form of two members 105 and 110 respectively having oversized apertures 106 and 111 therein, these apertures being larger than the outside diameter of the shank 65 and more particularly larger than the outside diameter of the crests 67 of the threads 66, all for a purpose hereinafter set forth.

FIG. 7 shows the initial deformation of the lip 85 upon first tightening of the nut 100. It is clear that first movement of the lip 85 is inwardly toward the thread 66 or shank 65 of the bolt 50A with a flexure of both the outer and inner facing surfaces 87 and 88.

FIG. 8 shows further deformation of the lip 85 and illustrates the cooperation between the outer and inner facing exterior surfaces 87 and 88 which causes the lip 85 to be deformed inwardly toward the threaded portion 66 of the shank 65 until the free end 91 of the lip enters the threaded area 66 of the shank. Continued compression of the lip 85 as seen in FIG. 4 results in the deformation of the lip toward and along the lead surface 60 and into the threaded area 66 of the shank 65 resulting in the free end 91 thereof being deformed into the area between the oversized aperture 106 of the member of work piece 105 and into the threaded area particularly replicating the crests 67 and valleys 68 of the first few threads 66 below the bolt head 55.

Because the cap 70 is preferably made from a relatively rigid synthetic organic resin rather than an elastomer with recovery properties, with the preferred resin being a thermoplastic such as polypropylene, ABS or nylon, the cap 70 is neither elastic nor resilient having no recovery properties and therefore, will cold flow upon deformation into the configurations illustrated in FIGS. 7 through 9. At any time during the tightening process, wherein the pressure on the nut 100 is released from the bolt 50A, the configuration of the cap 70 will remain as is, since the deformation is a cold flow deformation and not an elastic process. Specifically, after the nut 100 is fully tightening as shown in FIG. 9, release of the nut 100 will have substantially no effect on the configuration of the cap 70 and particularly will have no effect on the configuration of the lip 85 as then constituted. As seen from FIG. 9, under full tension and where the apertures 106 in the member 105 is oversized with respect to the shank 65 and more particularly the threads 66 thereon, a portion 95 of the free end 91 is deformed into the apertures 106 and around the first few convolutions of the thread 66 to form not only a liquid tight seal but also a hermetic seal between the bolt 50A and the members 105 and 110.

This cold flow deformation is due in part, as above described to angular disposition of and the cooperation of the outer and inner exterior faces 87 and 88 of the lip 85. Particularly, the lip 85 is shaped such that lines tangent to the outer exterior face 87 and to the inner face 88 both intersect the bolt shank 65, preferably the angle between the bolt shank 65 and the tangent to the outer exterior face being greater than the angle between the bolt shank and the tangent to the inner exterior face 88.

It is this relationship between the outer and inner exterior faces 87 and 88 which results in initial cold flow deformation of the lip 85 toward the shank 65 and thereafter along the surface 60 into the threads 66, as illustrated. This cold flow deformation pattern described is also affected by the relationship of the distances between the free end 91 of the lip 85 and the adjacent shank 65 and the distance between the juncture of the lip 89 and the lead surface 60 and the adjacent portion of the shank 65. As illustrated, it is preferred that the distance between the free end 91 and the shank 65 be less than the distance between the juncture 89 between the lip 85 and the lead surface 60 and the shank 65. Specifically for a bolt having 5/16 inch diameter it is preferred that the distance between the free end 91 and the adjacent threads 66 be about 0.05 inches and the distance between the free end 91 and the lead surface 60 be about 0.075 inches.

For a 5/16 inch diameter bolt, the line tangent to the inner exterior surface 88 makes an angle of about 15° with the shank 65 and the angle which a line tangent to the outer exterior surface 87 makes with the shank 65 is less than 60° or about 57°, the important feature being that the outer exterior surface 87 be at a greater angle to the shank 65 than the inner exterior surface 88 to ensure that the cold flow deformation takes place as illustrated in FIGS. 6 through 9. Additionally, the distance between the shank 65 and the free end 91 of the lip 85 should be less than the distance between the shank 65 and the juncture 89 of the lip 85 and lead surface 60, this also ensuring cold flow deformation as illustrated. Another important feature is that the distance between the free end 91 of the lip 85 and the lead surface 60 be greater than the distance between the juncture 89 and the thread 66 on the shank 65 to ensure that the cold flow deformation results in the plastic cap 70 entering the thread area 66.

Sometimes due to production inaccuracies the length of the lip 85 is insufficient to reach into the thread area 66 upon cold flow deformation; however, normally a successful liquid tight seal and usually hermetic seal is achieved by the cold flow deformation of the lip along the lead surface 60. This configuration provides significant advantages over prior art devices since the material, being neither elastic nor flexible, will not splay or fray from between the bolt head 55 and the next adjacent member 105 held in position. This is particularly true because the concept of the present invention is significantly different than the prior art in that the bolts 50 and 50A are not designed to be driven but designed to remain passive during the tightening process, which tightening is done almost exclusively by rotation of the nut 100. The bolt 50A is maintained against rotation by the use of a tool (not shown) having a surface which is a mirror image of the head retention portion 76, previously described.

An additional feature of the invention is the provision of additional plastic material in the portions 80 of the cap 70, which material is available upon tightening of the nut 100 to add to the material which cold flows between the lead surface 60 and the adjacent member 105.

It will be understood that various thermoplastic materials may be used in the invention without changing the fundamental advantages or concepts thereof, the preferred material being polypropylene but other acceptable materials being ABS, polyethylene, nylon and perhaps synthetic organic resins with various strengthening agents therein. Also while there has been disclosed certain measurements relative to a 5/16 inch diameter bolt, it will be appreciated that these measurements will change with an increase or decrease in bolt diameter, the concepts remaining the same.

While there has been disclosed what at present is considered to be the preferred embodiment of the present invention, it will be understood that various modifications and alterations may be made therein without departing from the spirit and scope of the invention and it is intended to cover in the claims appended hereto all such modifications and variations.

What is claimed is:

1. A bolt for a combination bolt and nut fastener for holding a plurality of members in predetermined spaced relation, said bolt comprising a shank having machine threads thereon adapted to receive a nut thereon, a bolt head laterally larger than said shank having a radially extending, planar lead surface, a synthetic organic resin cap capable of cold flow deformation substantially surrounding said bolt head, said synthetic organic resin cap having an annular lip depending axially downwardly therefrom with a portion thereof in contact with said planar lead surface and another portion thereof extending laterally inwardly toward said shank and having an inwardly facing surface, the length of said inwardly facing surface from the free end of said annular lip to the juncture thereof with said planar lead surface being at least as long as the distance between said juncture and the adjacent thread root such that the free end cold flows into the threads of said shank upon deformation of said lip providing a hermetic seal when the nut is tightened.

2. The bolt of claim 1, wherein said inwardly facing surface is substantially planar.

3. The bolt of claim 1, wherein said annular lip has an outer exterior surface facing away from said shank slanting toward said shank.

4. The bolt of claim 3, wherein said outer exterior surface of said lip is substantially planar.

5. The bolt of claim 1, wherein the synthetic organic resin cap is selected from the group of materials consisting of polypropylene, ABS and nylon and deformation is cold flow deformation under pressure.

6. The bolt of claim 1, wherein a line tangent to the inner exterior surface of said lip intersects said bolt shank at an angle of about 15°.

7. The bolt of claim 1, wherein a line tangent to the outer exterior surface of said lip intersects said shank at an angle of less than about 60°.

8. The bolt of claim 1, wherein the distance between the free end of said lip and said shank is not greater than about 50 mils.

9. The bolt of claim 1, wherein the portion of said bolt head facing away from said shank has a member thereon for cooperation with a tool to hold said bolt against rotation during nut tightening.

* * * * *

UNITED STATES PATENT AND TRADEMARK OFFICE
CERTIFICATE OF CORRECTION

PATENT NO. : 4,316,690
DATED : February 23, 1982
INVENTOR(S) : Ronald L. Voller

It is certified that error appears in the above-identified patent and that said Letters Patent are hereby corrected as shown below:

Column 3, line 32, after "bolt" insert --50--;

line 52, "and" first occurrence should be --the--.

Column 4, line 22, "of" should be --or--.

Signed and Sealed this

Eighteenth Day of May 1982

[SEAL]

Attest:

GERALD J. MOSSINGHOFF

Attesting Officer

Commissioner of Patents and Trademarks